(12) United States Patent
Lee et al.

(10) Patent No.: US 8,284,697 B2
(45) Date of Patent: Oct. 9, 2012

(54) SYSTEM AND METHOD FOR ESTIMATING FLOW-SPECIFIC TRAFFIC VOLUMES

(75) Inventors: Yong Lee, Seoul (KR); Sae-Woong Bahk, Seoul (KR); Woo-Guil Pak, Seoul (KR); Yong-Seok Park, Seongnam-si (KR); Wook Choi, Hwaseong-si (KR); Sun-Gi Kim, Seoul (KR)

(73) Assignees: Samsung Electronics Co. Ltd (KR); SNU R&DB Foundation (KR)

( * ) Notice: Subject to any disclaimer, the term of this patent is extended or adjusted under 35 U.S.C. 154(b) by 128 days.

(21) Appl. No.: 12/594,768

(22) PCT Filed: Apr. 7, 2008

(86) PCT No.: PCT/KR2008/001963
§ 371 (c)(1),
(2), (4) Date: Jul. 7, 2010

(87) PCT Pub. No.: WO2008/123732
PCT Pub. Date: Oct. 16, 2008

(65) Prior Publication Data
US 2010/0271973 A1  Oct. 28, 2010

(30) Foreign Application Priority Data
Apr. 5, 2007 (KR) ........................ 10-2007-0033696

(51) Int. Cl.
*H04L 1/00* (2006.01)
(52) U.S. Cl. ....................................................... 370/253
(58) Field of Classification Search .......... 370/229–239, 370/252, 389, 294, 395.5–395.53; 709/223–224, 709/238
See application file for complete search history.

(56) References Cited

U.S. PATENT DOCUMENTS 6,894,972 B1 * 5/2005 Phaal ............................. 370/229
(Continued)

FOREIGN PATENT DOCUMENTS

JP 2005-348416 12/2005
(Continued)

OTHER PUBLICATIONS

Sung-Su Kim et al., Netflow based IPv6 User's Flow Traffic Monitoring, '06 Autumn Integrated Conference, Nov. 2006, vol. 4, No. 2, pp. 42-46.

(Continued)

*Primary Examiner* — Frank Duong
(74) *Attorney, Agent, or Firm* — The Farrell Law Firm, P.C.

(57) ABSTRACT

A system and method for exactly estimating a volume of traffic is provided when packets are transferred within the network. The system and method receive data packets from clients through a plurality of router-for-clients, and creating a flow information packet for estimating information about a flow, transfer the data packets and the created flow information packet to the destination router-for-client via a router-for-relay, calculate information about the traffic of a flow at the destination router-for-client through the flow information packets transferred from the router-for-clients, and estimate a volume of the traffic. Thus, the system and method can estimate the volume of the traffic on the network with respect to the aggregated flow defined by the router pair connected to the terminal or the external network when the traffic is actually introduced into the network, instead of the flows of each terminal and each destination.

17 Claims, 7 Drawing Sheets

U.S. PATENT DOCUMENTS

| | | | |
|---|---|---|---|
| 7,193,968 B1 | 3/2007 | Kapoor et al. | |
| 7,460,487 B2 | 12/2008 | Hao et al. | |
| 7,788,371 B2 * | 8/2010 | Claise et al. | 709/224 |
| 2009/0168648 A1 * | 7/2009 | Labovitz et al. | 370/229 |

FOREIGN PATENT DOCUMENTS

| | | |
|---|---|---|
| KR | 10-2003-0028013 | 4/2003 |
| KR | 10-2006-0023372 | 3/2006 |
| KR | 10-2006-0063544 | 6/2006 |

OTHER PUBLICATIONS

Abhishek Kumar et al., Space-Code Bloom Filter for Efficient Per-Flow Traffic Measurement, INFOCOM 2004, $23^{rd}$ Annual Joint Conference of the IEEE Computer and Communication Societies, vol. 3, Mar. 2004, pp. 1762-1773.

Jaroslav Kysela et al., Software for Netflow Monitoring Adaptor, CESNET Technical Report No. 33/2005, Dec. 20, 2005, pp. 1-15.

* cited by examiner

[Fig. 4]
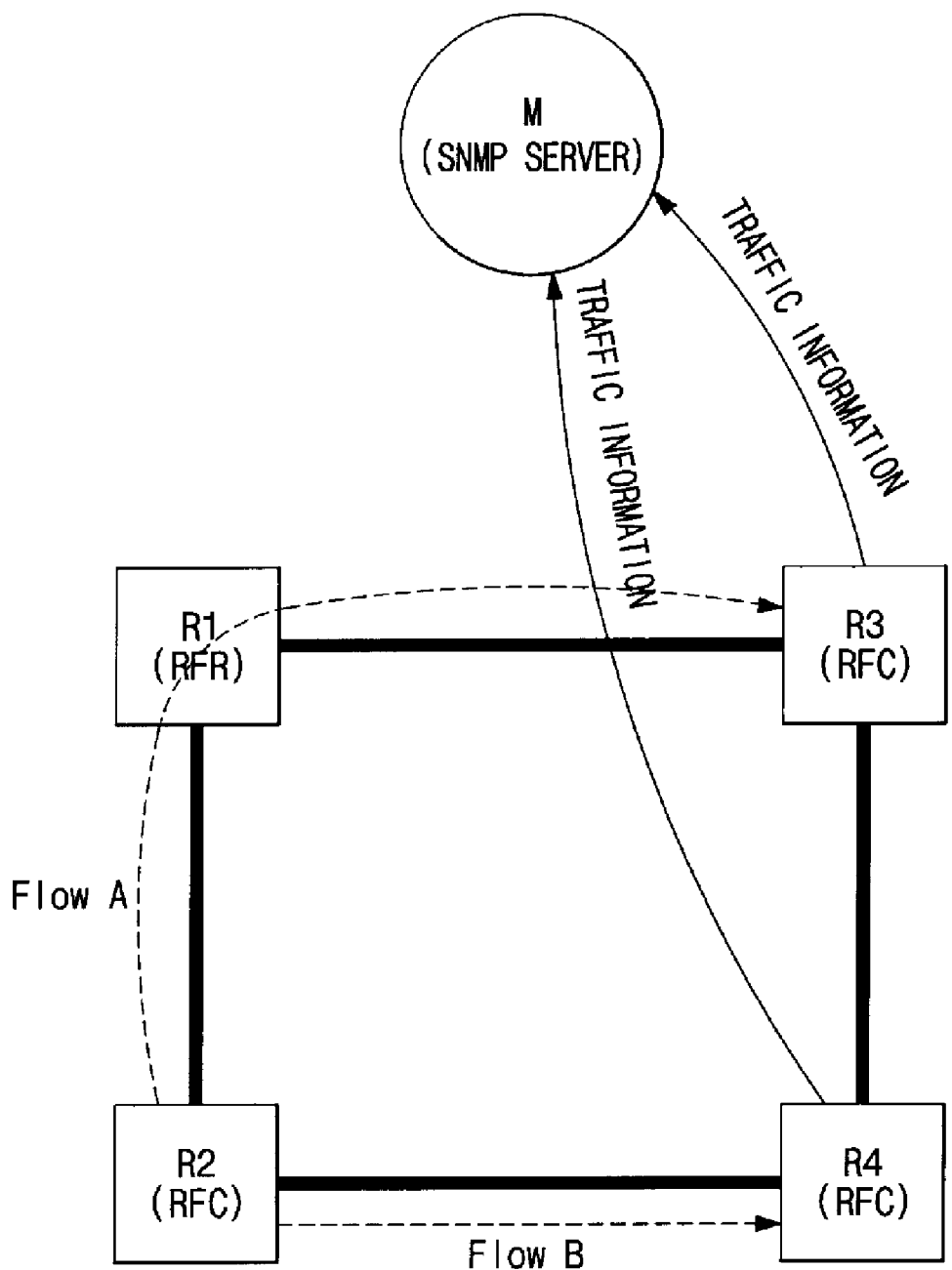

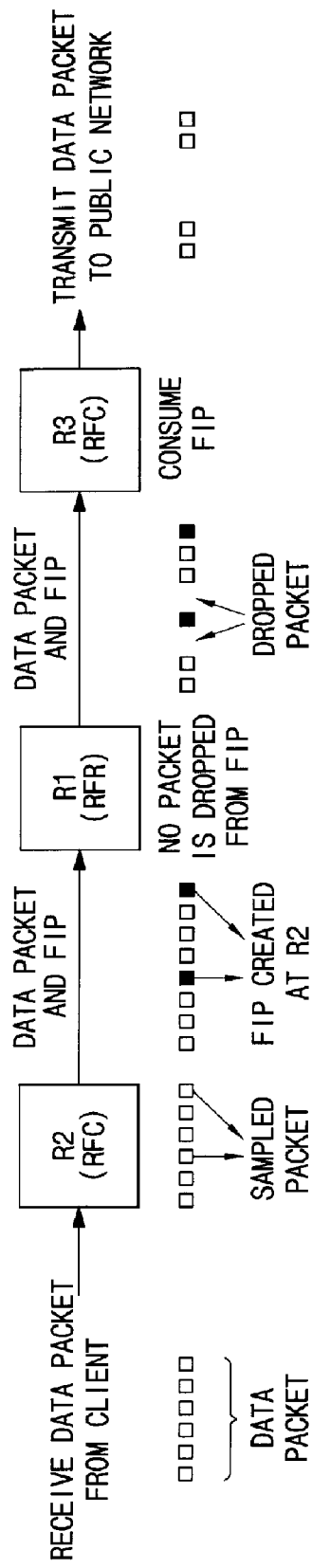
[Fig. 5]

[Fig. 6]
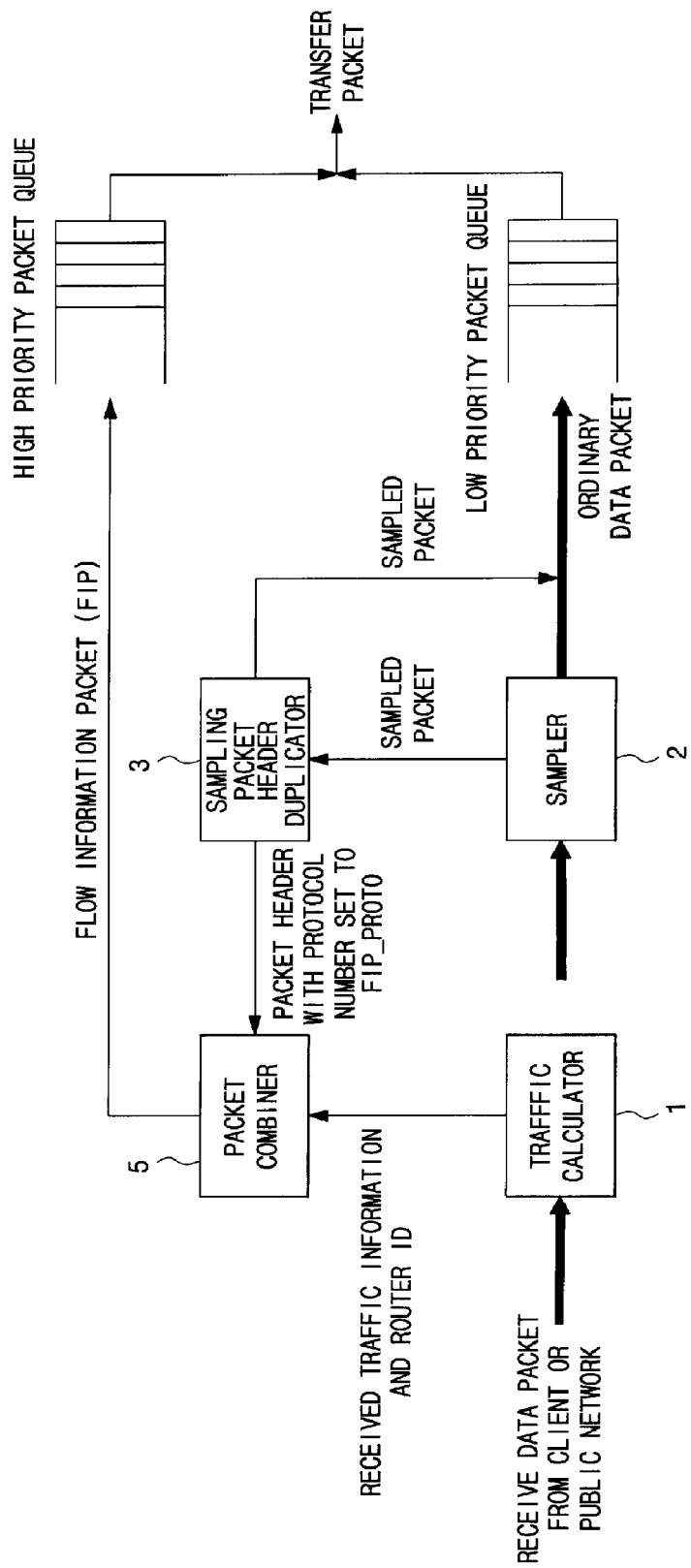

[Fig. 7]
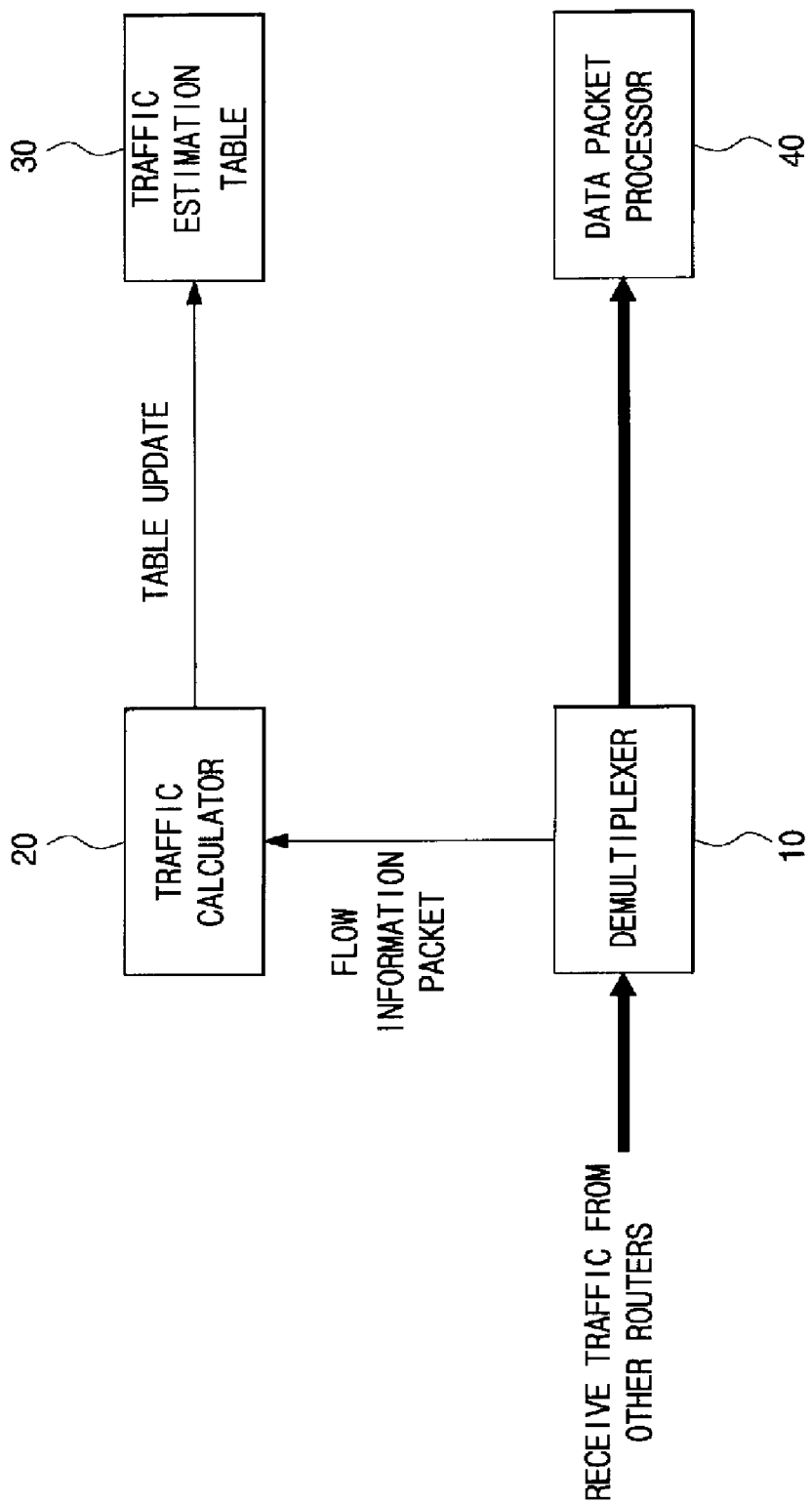

SYSTEM AND METHOD FOR ESTIMATING FLOW-SPECIFIC TRAFFIC VOLUMES

PRIORITY

This application claims priority to Korean Patent Application Serial No. 2007-0033696 filed Apr. 5, 2007; and to International Application PCT/KR2008/001963 filed Apr. 7, 2008; the contents of each of which are incorporated herein by reference.

TECHNICAL FIELD

The present invention relates to a system and method for estimating flow-specific traffic volumes of combined layer 2/layer 3 (L2/L3) based routers and, more particularly, to a system and method for exactly estimating a volume of traffic introduced into a network regardless of a packet loss occurring when packets are transferred within the network.

BACKGROUND ART

Known flow traffic estimation techniques are methods of measuring traffic of flows transferred over a current network, and make use of a method of storing all pieces of traffic (reference population) transferred for a given time and predicting traffic attributes of a parent population using characteristics of the reference population.

Among the methods, the typical one includes "traffic estimation for the largest sources on a network using packet sampling with limited storage", which is proposed by Hewlett Packard company.

In conjunction with this method, each router constituting the network typically stores information about received traffic and transmitted traffic, and transmits the information about the received and transmitted traffic to a specific sever (e.g. simple network management protocol (SNMP) server) using an SNMP.

However, this known method can merely predict the characteristics of the traffic transferred over the current network, but it cannot provide a bandwidth of the traffic requested actually, and so on.

For example, as illustrated in FIG. 1, three routers R1, R2 and R3 are interconnected in a row. It is assumed that the bandwidths between the routers R1 and R2 and the routers R2 and R3 at present be 100 Mbps and 50 Mbps, respectively. A traffic volume of 80 Mbps, which is received by the first router R1, is transferred to the router R3 with a traffic volume of 50 Mbps. As a result, the traffic volume of 30 Mbps is lost at the router R2.

Meanwhile, FIG. 2 illustrates the configuration and concept of a system in order to explain a known process in which a plurality of routers R1 through R4 transfer traffic information to a specific server (SNMP server) M.

As illustrated in FIG. 2, each of the multiple routers R1 through R4 constituting a known network stores its own received and transferred traffic information, and transfers the received and transferred traffic information to the SNMP server M. The SNMP server M forms information about distribution of the entire traffic of the network on the basis of the information received from the routers R1 through R4.

FIG. 3 is a schematic view explaining the process in which each router calculates traffic information.

As illustrated in FIG. 3, each router calculates information about received traffic using a method of measuring a volume of the received traffic through a traffic calculator 100 and storing the measured traffic volume in a traffic estimation table 200. A received data packet is transferred to and processed at a data packet processor 300.

DISCLOSURE OF INVENTION

Technical Problem

In the case of this known method, the result of measuring the currently transferred traffic volume is 80 Mbps or 50 Mbps, which depends on at which router the traffic volume is measured.

Also, there is used a method of measuring and managing the traffic based on each session or each interface.

Technical Solution

The present invention has been made to solve the foregoing problems of the prior art and therefore the present invention provides a system and method for estimating flow-specific traffic volumes of combined layer 2/layer 3 (L2/L3) based routers, which exactly estimate a volume of traffic introduced into a network regardless of a packet loss occurring when packets are transferred within the network, thereby promoting exact network management, and which obtain the traffic volume with respect to a flow between routers rather than sessions, thereby securing high scalability so as to be able to be used regardless of network capability.

According to an aspect of the invention, there is provided a system for estimating flow-specific traffic volumes of combined layer 2/layer 3 (L2/L3) based routers, which includes: a plurality of router-for-clients, which creates or consumes the traffic; a router-for-relay, which transfers a packet to the plurality of router-for-clients; and a simple network management protocol server, which receives information about the traffic, which is measured and transferred, from each router-for-client and forms information about distribution of the entire traffic of the network.

Here, each router-for-relay may receive a data packet from a client, create a flow information packet for estimating information about the received flow, and transfer the data packet and the flow information packet to a destination one of the router-for-clients via the router-for-relay.

Further, the router-for-client may set the flow information packet to a high priority.

Also, the destination router-for-client, which receives the data packet and the flow information packet, may consume the received flow information packet, and transfer the data packet to a next destination.

In addition, the destination router-for-client may calculate the traffic information about a flow through the received flow information packet, and transfer the calculated result to the simple network management server.

Meanwhile, the router-for-client for a destination may include: a traffic calculator, which receives the traffic transferred from a client or a public network, and calculates the traffic; a sampler, which takes a sample of incoming data packets at fixed periods; a sampling packet header duplicator, which creates a packet having the same header as the sampled data packet; and a packet combiner, which stores traffic information and router identification obtained through the traffic calculator in a body of the packet created through the sampling packet header duplicator, and creates a new packet.

Here, the traffic calculator may calculate a volume of the traffic received from the client or the public network per second except the traffic received from the other routers.

Further, the sampler may select the packet at fixed periods, and create the packet having the same header as the selected packet.

Meanwhile, the router-for-client for a destination may include: a demultiplexer, which demultiplexes the traffic received from the other routers; a traffic calculator, which calculates the traffic using a flow information packet transferred by the demultiplexer; a traffic estimation table, which measures and stores a volume of the traffic transferred by the traffic calculator; and a data packet processor, which ordinarily processes data packets transferred by the demultiplexer.

Here, the demultiplexer may filter only the flow information packet of the packets received from the other routers, and transmit the filtered flow information packet to the traffic calculator and ordinary data packets to the data packet processor.

Further, the traffic calculator may extract traffic information stored in the flow information packet received from the demultiplexer, and store the traffic information and its estimated traffic information in the traffic estimation table.

According to another aspect of the present invention, there is provided a method for estimating flow-specific traffic volumes of combined layer 2/layer 3 (L2/L3) based routers, which includes: receiving data packets from clients through a plurality of router-for-clients, and creating a flow information packet for estimating information about a flow; transferring the data packets and the created flow information packet to a destination one of the router-for-clients via a router-for-relay; calculating information about the traffic of a flow at the destination router-for-client through the flow information packets transferred from the router-for-clients, and extracting the traffic volume; and transferring the traffic information calculated at the destination router-for-client to a simple network management protocol server, and transferring the data packets transferred from the router-for-clients to a next destination.

Here, the flow information packet may be set to a high priority through the router-for-relay.

Further, the creating of the flow information packets through the router-for-clients may include: receiving the traffic transferred from the clients or public networks, and calculating the traffic; taking a sample of incoming data packets at fixed periods; creating a packet having the same header as the sampled data packet; and storing traffic information and router identification, which are obtained by calculating the traffic, in a body of the packet created through the sampling packet header duplicator.

In addition, the calculating of information about the traffic of a flow at the destination router-for-client to extract the traffic volume may include: demultiplexing, by a demultiplexer, the traffic received from the other routers; calculating the traffic using a flow information packet transferred by the demultiplexer; measuring the traffic volume through the calculated traffic and storing the measured result in a traffic estimation table; and ordinarily processing data packets transferred by the demultiplexer.

Meanwhile, among the packets received from the other routers, only the flow information packet may be filtered and transmitted to a traffic calculator, and ordinary data packets may be transmitted to a data packet processor.

Here, the calculating of the traffic may include extracting, by a traffic calculator, traffic information stored in the received flow information packet, and storing the traffic information and its estimated traffic information in the traffic estimation table.

Further, the calculated traffic information may be obtained through the traffic information included in the flow information packet, and a number of the flow information packets received for a predetermined time.

Advantageous Effects

As described above, the present invention can estimate the volume of the traffic on the network with respect to the aggregated flow defined by the router pair connected to the terminal or the external network when the traffic is actually introduced into the network, instead of the flows of each terminal and each destination, so that it has high scalability of network capability, and estimates an exact traffic volume compared to the measured traffic. Thus, the present invention can effectively cope with the network management, the traffic management, and so on using these results.

BRIEF DESCRIPTION OF THE DRAWINGS

FIG. 4 illustrates the configuration and concept of a system in order to explain a process of transferring information about traffic measured by a specific router to a specific server according to the present invention;

FIG. 5 illustrates a process of calculating traffic information about a flow for the specific router of FIG. 4 using a data packet, and transmitting the calculated information to a specific server;

FIG. 6 schematically illustrates the configuration of a router R2 for transferring the flow information packet of FIGS. 4 and 5, and the operation that occurs at this transfer router; and FIG. 7 schematically illustrates the configuration of a router R3 for receiving the flow information packet of FIGS. 4 and 5, and the operation that occurs at this receive router.

BEST MODE FOR CARRYING OUT THE INVENTION

Figure 1:
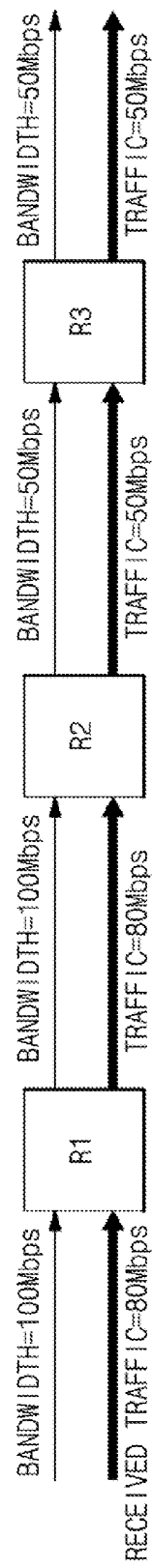
FIG. 1 is a view explaining the conventional prediction of characteristics of traffic transferred over a network.
Figure 2:
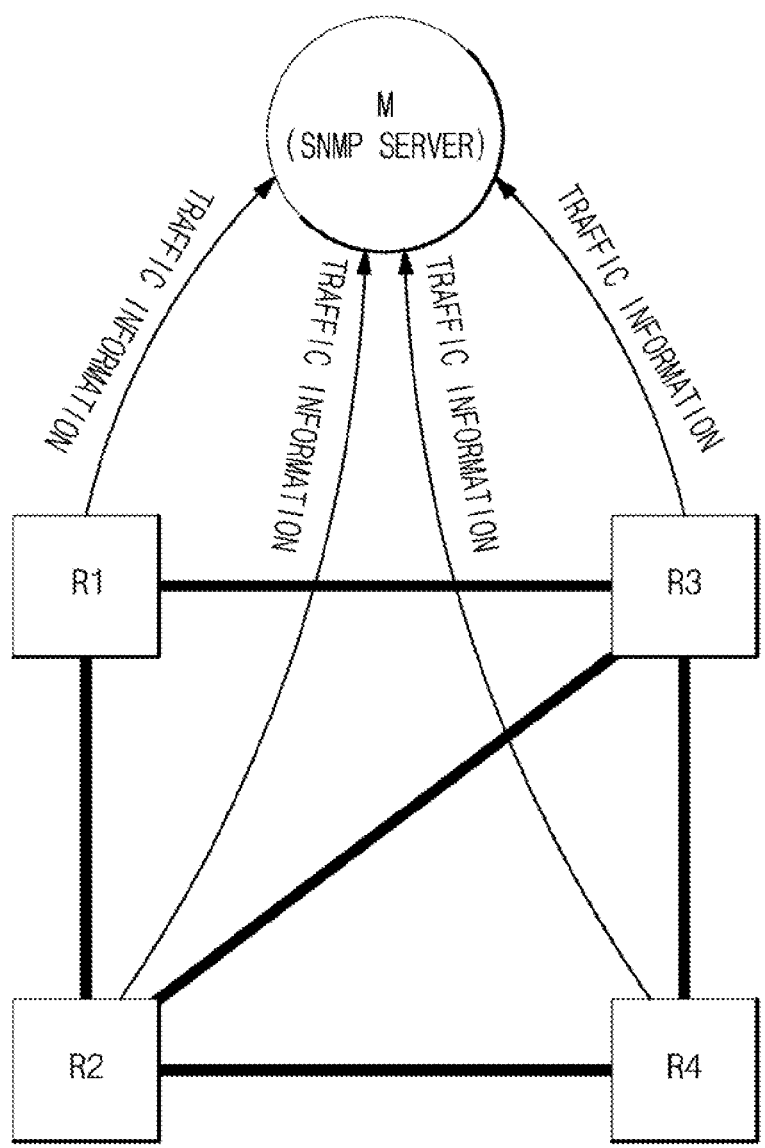
FIG. 2 illustrates the configuration and concept of a system for explaining a conventional process in which a plurality of routers transfer information about traffic to a specific server.
Figure 3:
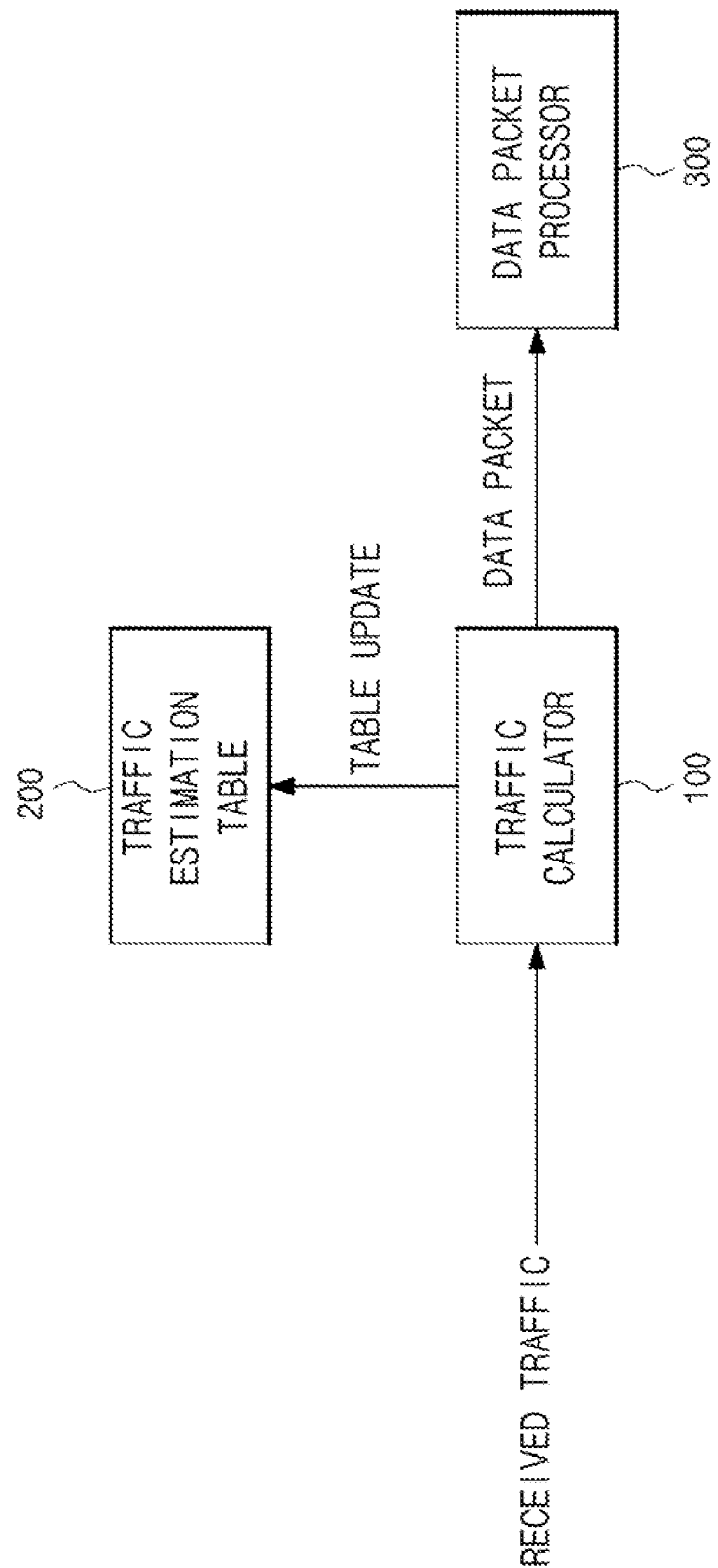
FIG. 3 is a schematic view explaining the process in which each router calculates traffic information.

The present invention will now be described more fully hereinafter with reference to the accompanying drawings, in which exemplary embodiments thereof are shown.

FIG. 4 illustrates the configuration and concept of a system in order to explain a process of transferring information about traffic measured by a specific router to a specific server according to the present invention. Here, three flows from R2 to R3, from R3 to R1, and from R2 to R4 are illustrated.

As illustrated in FIG. 4, a system for estimating flow-specific traffic volumes of combined layer 2/layer 3 (L2/L3) based routers includes a plurality of router-for-clients (RFCs) R2, R3, and R4, which create or consume traffic over a network, such as access routers connected with terminals or gateways connected with an external network, a router-for-relay (RFR) R1, which transmits a packet to the RFC routers R1, R3 and R4, and a simple management protocol (SNMP) server M, which receives information about the transmitted traffic from the RFC routers R1, R3 and R4 and forms information about distribution of the entire traffic of the network.

Meanwhile, the traffic information transmitted to the SNMP server M is measured and transmitted by the RFC routers R1, R3 and R4, which consume the traffic (i.e. receive the traffic, and then transmit the received traffic to the terminal or the external network).

If the RFC router R2 does not consume the traffic, the traffic information is not transmitted to the SNMP server M.

FIG. 5 illustrates a process of calculating traffic information about a flow for the specific router of FIG. 4 using a data packet, and transmitting the calculated information to a specific server, particularly the operation of the router in conjunction with an R2-R3 flow (e.g. Flow A of FIG. 4).

First, as in FIG. 5, an RFC router R2 receives a data packet from a client, and creates a flow information packet (FIP), which is a packet used to estimate information about the received packet Afterwards, the RFC router R2 transmits the data packet and the created FIP to the destination RFC router R3 via the RFR router R1.

Meanwhile, the router (e.g. router R1) between the routers R2 and R3 processes the FIP in a manner such that a high priority is set for the FIP, so that no packet loss occurs.

Next, the destination router R3, which receives the data packet and the FIP transmitted by the router R2, consumes the received FIP for itself, and transmits the data packet to a next destination (public network).

The router R3 calculates traffic information about an R2-R3 (Flow A) using the received FIP, and then the calculated information to the SNMP server M.

FIG. 6 schematically illustrates the configuration of a router R2 for transferring the flow information packet of FIGS. 4 and 5, and the operation that occurs at this transfer router.

As illustrated in FIG. 6, the router R2 includes a traffic calculator 1, which receives traffic transferred from a client or a public network and then calculates the traffic, a sampler 2, which takes a sample of incoming data packets at fixed periods Ts as in FIG. 5, a sampling packet header duplicator 3, which creates a packet having the same header as the sampled data packet, and a packet combiner 5, which stores traffic information and router identification (ID) obtained through the traffic calculator 1 in a body of the packet created through the sampling packet header duplicator 3 to create a new packet.

The traffic calculator 1 calculates a traffic volume $R_{total\ flow}$, which is received from the client or the public network per second except the traffic received from the other routers.

Aside from this, the sampler 2 selects the packet at fixed periods, and then creates a packet having the same header as the selected packet.

Meanwhile, the selected packet is again transferred in an ordinary data packet queue, i.e. in a low-priority packet queue, and is processed like the ordinary packet.

In contrast, the newly created packet is adapted so that a protocol number, which is allocated to an Internet protocol (IP) header thereof, is changed into a value of FIP_PROTO (one selected from values from 138 to 252). The packet combiner 5 stores the information received through the traffic calculator 1 in the packet body, thereby creating the FIP.

The FIP is transferred and processed in a high-priority packet queue such that it can be transferred regardless of the state of a transfer queue when transferred by the RFC or RFR router.

FIG. 7 schematically illustrates the configuration of a router R3 for receiving the flow information packet of FIGS. 4 and 5, and the operation that occurs at this receive router.

As illustrated in FIG. 7, the router R3 includes a demultiplexer 10, which demultiplexes traffic received from the other routers, a traffic calculator 20, which calculates the traffic using an FIP transferred by the demultiplexer 10, a traffic estimation table 30, which measures and stores a volume of the traffic transferred by the traffic calculator 20, and a data packet processor 40, which ordinarily processes data packets transferred by the demultiplexer 10.

Here, the demultiplexer 10 filters only the FIP of the packets received from the other routers, and transmits the filtered FIP to the traffic calculator 20 and ordinary data packets to the data packet processor.

Further, the traffic calculator 20 extracts traffic information stored in the FIP received from the demultiplexer 10, and stores the traffic information and its estimated traffic information in the traffic estimation table 30.

The estimated traffic information can be obtained from the traffic information contained in the FIP (i.e. the ID of the router that creates and transfers the FIP, and the traffic volume per second) and the number of FIPs received for a predetermined time, and its detailed method of estimating the traffic volume is as follows.

The FIP reaches a destination, an RFC router, via at least one RFR router, and the RFC router calculates a traffic volume $R_{flow}$ of a flow from the received FIP with respect to a transfer router's ID SRCID and an ID pair thereof. A method of calculating the traffic volume is as follows.

$R_{flow}$=Number of FIPs received from SRCID router for a time of $T_{window}/T_{window}*R_{total\ flow}$ Here, $T_{window}$ is a time for which the RFC router receives the FIP, and has a value greater than Ts.

While the present invention has been shown and described in connection with the exemplary embodiments, it will be apparent to those skilled in the art that modifications and variations can be made without departing from the spirit and scope of the invention as defined by the appended claims.

The invention claimed is:

1. A system for estimating flow-specific traffic volumes of combined layer 2/layer 3 (L2/L3) based routers, which is used to exactly estimate a volume of traffic introduced into a network, the system comprising:
 a plurality of router-for-clients, which creates or consumes the traffic;
 a router-for-relay, which transfers a packet to the plurality of router-for-clients; and
 a simple network management protocol server, which receives information about the traffic, which is measured and transferred, from each router-for-client and forms information about distribution of the entire traffic of the network,
 wherein each router-for-relay receives a data packet from a client, creates a flow information packet for estimating information about the received flow, and transfers the data packet and the flow information packet to a destination one of the router-for-clients via the router-for-relay.

2. The system according to claim 1, wherein the router-for-client sets the flow information packet to a high priority.

3. The system according to claim 1, wherein the destination router-for-client, which receives the data packet and the flow information packet, consumes the received flow information packet, and transfers the data packet to a next destination.

4. The system according to claim 3, wherein the destination router-for-client calculates the traffic information about a flow through the received flow information packet, and transfers the calculated result to the simple network management server.

5. The system according to claim 1, wherein the router-for-client for a destination includes:
a traffic calculator, which receives the traffic transferred from a client or a public network, and calculates the traffic;
a sampler, which takes a sample of incoming data packets at fixed periods;
a sampling packet header duplicator, which creates a packet having the same header as the sampled data packet; and
a packet combiner, which stores traffic information and router identification obtained through the traffic calculator in a body of the packet created through the sampling packet header duplicator, and creates a new packet.

6. The system according to claim 5, wherein the traffic calculator calculates a volume of the traffic received from the client or the public network per second except the traffic received from the other routers.

7. The system according to claim 5, wherein the sampler selects the packet at fixed periods, and creates the packet having the same header as the selected packet.

8. The system according to claim 1, wherein the router-for-client for a destination includes:
a demultiplexer, which demultiplexes the traffic received from the other routers;
a traffic calculator, which calculates the traffic using a flow information packet transferred by the demultiplexer;
a traffic estimation table, which measures and stores a volume of the traffic transferred by the traffic calculator; and
a data packet processor, which ordinarily processes data packets transferred by the demultiplexer.

9. The system according to claim 8, wherein the demultiplexer filters only the flow information packet of the packets received from the other routers, and transmits the filtered flow information packet to the traffic calculator and ordinary data packets to the data packet processor.

10. The system according to claim 8, wherein the traffic calculator extracts traffic information stored in the flow information packet received from the demultiplexer, and stores the traffic information and its estimated traffic information in the traffic estimation table.

11. A method for estimating flow-specific traffic volumes of combined layer 2/layer 3 (L2/L3) based routers, which is used to exactly estimate a volume of traffic introduced into a network, the method comprising:
receiving data packets from clients through a plurality of router-for-clients, and creating a flow information packet for estimating information about a flow;
transferring the data packets and the created flow information packet to a destination one of the router-for-clients via a router-for-relay;
calculating information about the traffic of a flow at the destination router-for-client through the flow information packets transferred from the router-for-clients, and extracting the traffic volume; and
transferring the traffic information calculated at the destination router-for-client to a simple network management protocol server, and transferring the data packets transferred from the router-for-clients to a next destination.

12. The method according to claim 11, wherein the flow information packet is set to a high priority through the router-for-relay.

13. The method according to claim 11, wherein the creating of the flow information packets through the router-for-clients includes:
receiving the traffic transferred from the clients or public networks, and calculating the traffic;
taking a sample of incoming data packets at fixed periods;
creating a packet having the same header as the sampled data packet; and
storing traffic information and router identification, which are obtained by calculating the traffic, in a body of the packet created through the sampling packet header duplicator.

14. The method according to claim 11, wherein the calculating of information about the traffic of a flow at the destination router-for-client to extract the traffic volume includes:
demultiplexing, by a demultiplexer, the traffic received from the other routers;
calculating the traffic using a flow information packet transferred by the demultiplexer;
measuring the traffic volume through the calculated traffic and storing the measured result in a traffic estimation table; and
ordinarily processing data packets transferred by the demultiplexer.

15. The method according to claim 14, wherein among the packets received from the other routers, only the flow information packet is filtered and transmitted to a traffic calculator, and ordinary data packets are transmitted to a data packet processor.

16. The method according to claim 14, wherein the calculating of the traffic includes extracting, by a traffic calculator, traffic information stored in the received flow information packet, and storing the traffic information and its estimated traffic information in the traffic estimation table.

17. The method according to claim 16, wherein the calculated traffic information is obtained through the traffic information included in the flow information packet, and a number of the flow information packets received for a predetermined time.

* * * * *